Nov. 12, 1940.  B. SASSEN  2,221,459
MANUALLY CONTROLLED CONTOURING MACHINE
Filed Sept. 3, 1937  4 Sheets-Sheet 1

INVENTOR.
BERNARD SASSEN
BY
OHK Parsons
ATTORNEY.

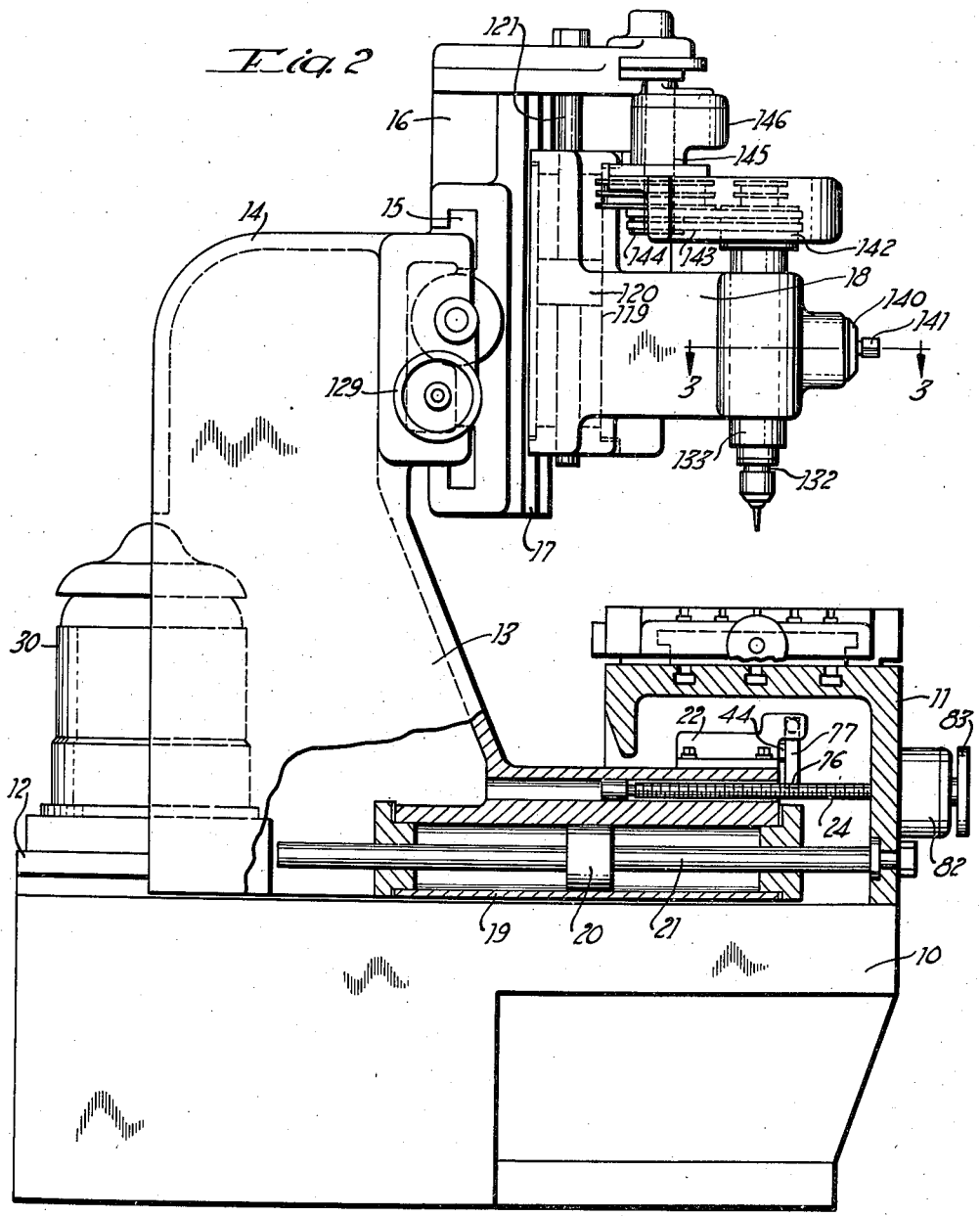

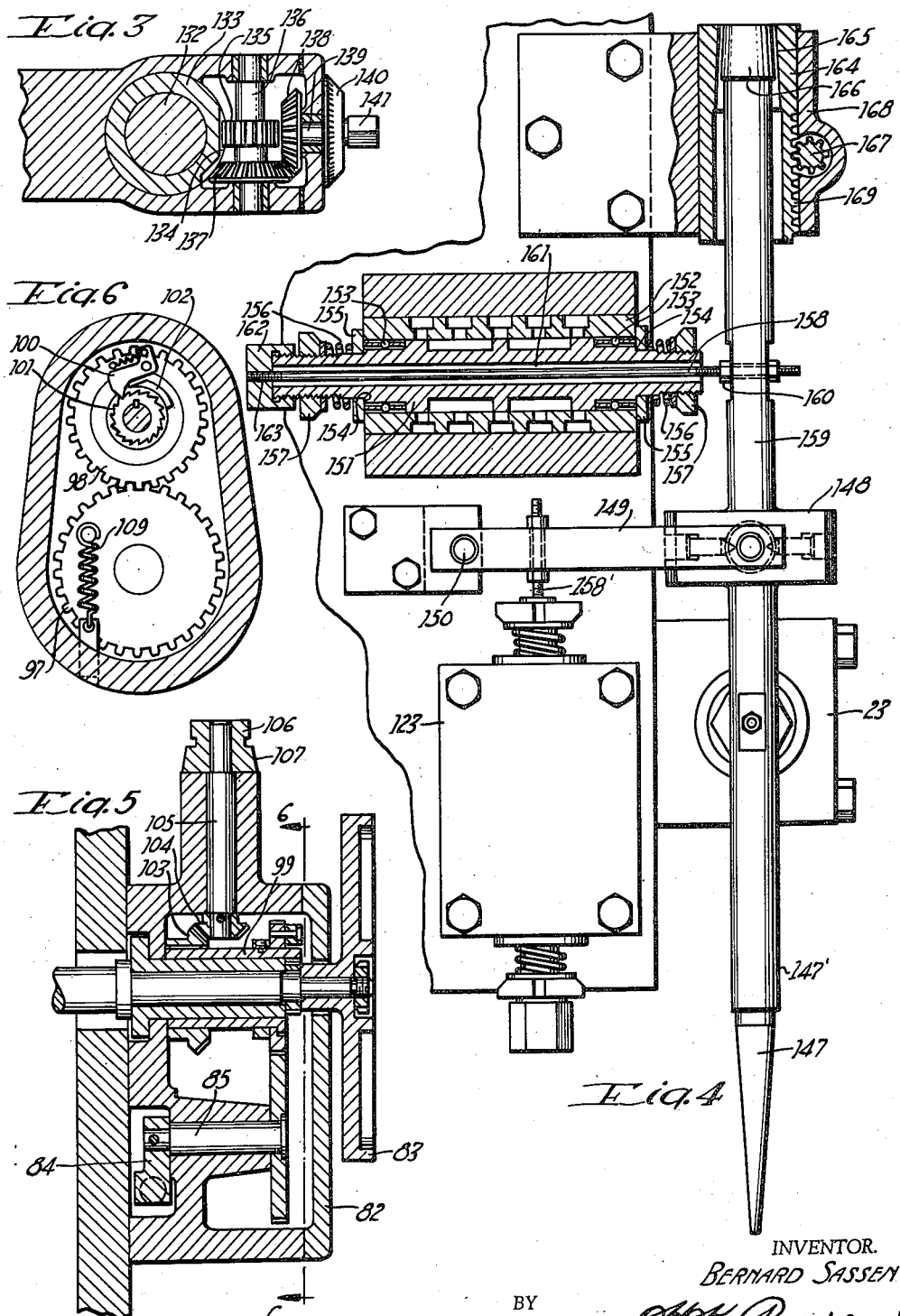

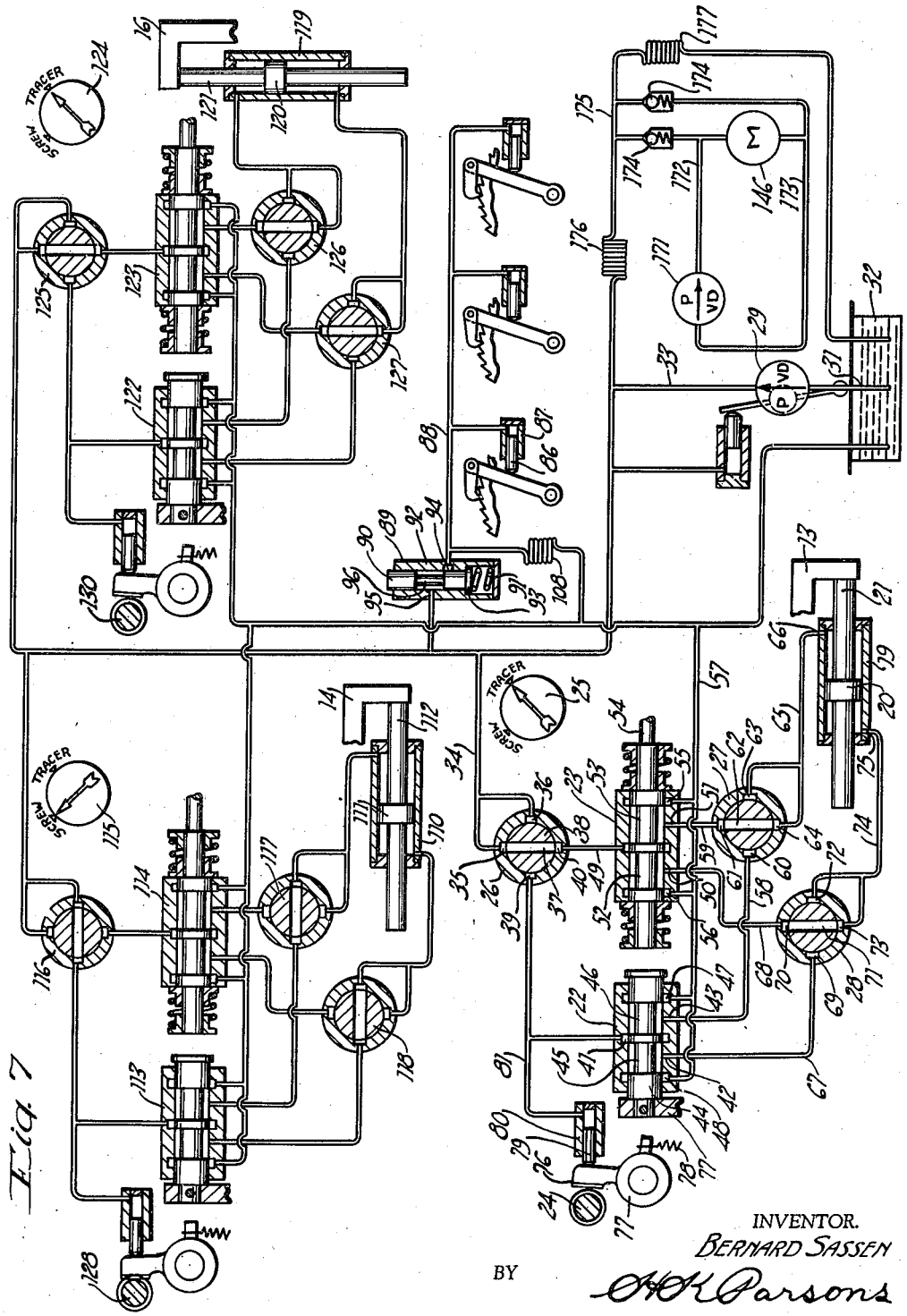

Patented Nov. 12, 1940

2,221,459

UNITED STATES PATENT OFFICE 2,221,459

MANUALLY CONTROLLED CONTOURING MACHINE

Bernard Sassen, Cincinnati, Ohio, assignor to The Cincinnati Milling Machine Company, Cincinnati, Ohio, a corporation of Ohio Application September 3, 1937, Serial No. 162,231

14 Claims. (Cl. 90—13.5)

This invention relates to milling machines and more particularly to improvements in reproducing machines.

One of the objects of this invention is to provide a compact bench type of profiling and die sinking machine which may be efficiently utilized for reproducing small parts.

Another object of this invention is to provide in a machine of the character described improved means for obtaining three-directional control of power movement between tool and work with a single control element such as a tracer.

A further object of this invention is to provide a bench type of reproducing machine in which the pattern may be easily and quickly scanned by a manually actuable tracer requiring a minimum of manual pressure, so that operation of the machine will not be tiring on the operator.

An additional object of this invention is to provide a machine of the character described with selective controls for coupling the tracer to govern the movement of any one of three slides individually, or of any two or more of the slides simultaneously.

Other objects and advantages of the present invention should be readily apparent by reference to the following specifications considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 2 is a side view of the machine shown in Figure 1 viewed from the left hand side of that figure.

Figure 3 is a detail section of the quill adjusting mechanism for the cutter spindle as viewed on line 3—3 of Figure 2.

Figure 4 is an enlarged view, partly in section, showing the tracer controlled valves and operative connections of the tracer.

Figure 5 is a detail section through one of the indexing mechanisms.

Figure 6 is a detail section on line 6—6 of Figure 5.

Figure 7 is a diagrammatic view of the hydraulic control circuit of the machine.

Figure 1:
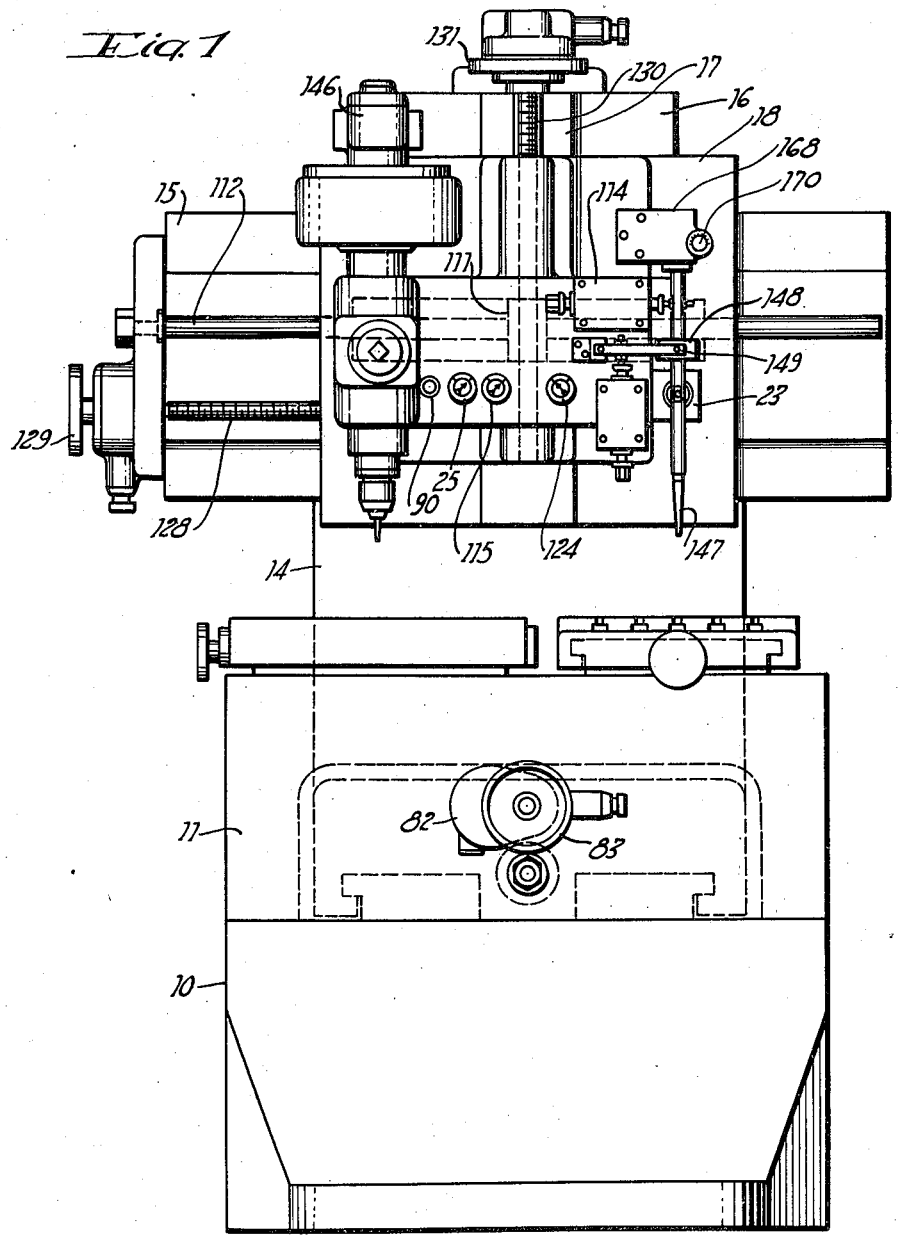
Figure 1 is a front elevation of a machine tool embodying the principles of this invention.

In the automatic reproduction of patterns and dies, especially those of irregular shape or contour, it is difficult to set up an automatic machine that will scan the entire surface of the article to be reproduced without scanning intermediate surfaces that are of no consequence so far as the article to be reproduced is concerned, and may be termed blank areas. This results in a waste of time and uneconomical use of the machine.

This invention deals with a machine in which the tracer does not automatically scan a surface in any given plane, but in which the tracer is deflected at will by the operator in the directions in which it is desired that the tool shall travel, whereby the tool is continuously working and removing desired material and no time is wasted in cutting air.

Briefly, the machine comprises three slides capable of causing relative movement between a tool and work piece in three directions normal to one another, and by combining the movements of these slides, universal movement between the tool and work becomes possible. Power operable means is provided for moving these slides, comprising servo motors which may be individually controlled by hand through conventional hand wheels, or they may be selectively connected in various combinations for control by a tracer.

Referring to Figures 1 and 2 of the drawings, the reference numeral 10 indicates the base of the machine which is of the solid bed type, and which has an uprising integral portion 11 for supporting the work and pattern. The bed 10 is provided with guideways 12 upon which is slidably mounted a saddle 13. This saddle has an uprising portion 14 upon which is formed horizontal guideways 15 for supporting a cross slide 16. This slide in turn has vertical guideways 17 for receiving a vertically movable ram 18 which carries the cutter and tracer.

As shown in Figure 2, the saddle 13 has a cylinder 19 integrally formed therewith, in which is contained a piston 20 connected by a piston rod 21 to the bed 10, whereby the piston 20 is held stationary, and the cylinder 19 is moved when pressure is admitted to the cylinder.

The flow of fluid pressure to this cylinder may be selectively controlled from either one of two servo-valves 22, 23, the first of which is actuated by a servo screw 24, and the latter of which is connected for actuation by the tracer. A selector valve, having an operating knob 25, is mounted on the front of the machine, as shown in Figure 1, for choosing between the method of control, and sections through this valve are shown at 26, 27 and 28.

The actuating fluid for this motor, as well as the motors which operate the other slides is supplied by a variable delivery pump 29, mounted in the bed 10. The motor is driven by an electric motor 30, which is shown mounted on the rear of the bed. The pump has an intake 31 through which fluid is withdrawn from a reservoir 32; and a delivery line 33, through which fluid is delivered under pressure to the various motors.

The delivery line has a branch 34 which is connected to ports 35 and 36 of the selector valve, and these ports are alternately connected by a cross bore 37, in the plunger 38 of the selector valve, to ports 39 and 40 which lead respectively to the servo control valves 22 and 23. The servo-valve 22 has a pressure port 41, and motor ports 42 and 43, whereby when the plunger 44 of this valve is shifted to the right of its central position, the pressure port 41 is connected by annular groove 45 to port 42, and the motor port 43 is connected by the annular groove 46 to the reservoir port 47. When the plunger is shifted in the opposite direction, the motor port 42 is connected by groove 45 to the exhaust port 48, and the motor port 43 is connected to the pressure port 41.

Similarly, the servo-valve 23 has a pressure port 49 and motor ports 50 and 51 which are selectively connected by annular grooves 52 and 53 to the pressure port depending upon the longitudinal position of the valve plunger 54 in which the grooves are formed. In other words, when the plunger is shifted to the right, pressure port 49 is connected to motor port 50 and motor port 51 is connected to exhaust port 55, and when it is shifted to the left, motor port 51 is connected to pressure port 49 and motor port 50 is connected to exhaust port 56. It will be noted that the exhaust ports 48, 47, 56 and 55 of these servo-motors are connected to a common return line 57.

The motor ports 43 and 51 are connected by channels 58 and 59 respectively to ports 60 and 61 of the selector valve, and as shown in section 27 of this valve, a diametrical bore 62 serves to selectively connect these ports to ports 63 and 64 which are both connected through channel 65 to port 66 of cylinder 19.

The motor ports 42 and 50 are connected by channels 67 and 68 to ports 69 and 70 respectively of the selector valve, as shown in section 28 thereof, whereby these ports may be selectively connected by a cross bore 71 to ports 72 and 73 which lead by way of channel 74 to port 75 of cylinder 19.

When the control knob 25 for the selector valve is set on "Tracer," as shown in Figure 7, the fluid supply line 34 is connected to the pressure port 49 of the servo-valve 23, and the motor ports 50 and 51 of this valve are connected to opposite ends of the cylinder 19. Counterclockwise rotation of the control knob 25 to position it on "Screw" will cause the supply line 34 to be connected to the pressure port 41 of the servo control valve 22 and also cause the motor ports 42 and 43 to be connected to opposite ends of the cylinder 19.

The servo-valve 22 is mounted on the saddle 13, as shown in Figure 2, and in such a position that the end of the plunger 44 may be connected by a segmental nut 76 to the screw 24. The segmental nut is formed in the end of a crank arm 77 which is pinned to the end of the plunger 44 and is normally held out of engagement with the screw by means of a spring 78. It will be noted from Figure 7 that a fluid operable plunger 79, reciprocably mounted in a cylinder 80, is provided for rotating the crank arm against the opposition of the spring to effect engagement between the parts. The cylinder 80 is connected by a branch line 81 to the port 39 of the selector valve, whereby, when this port is connected to pressure, the nut and screw are automatically interengaged.

It will be noted that the servo-screw 24 has no permanent mechanical connection with the saddle 13, all movement of the saddle being effected by fluid pressure acting in cylinder 19.

As shown in Figure 5, the servo-screw is supported in a housing 82 attached to the front of the bed and has a manually operable disc or wheel 83 keyed to the end thereof for direct actuation.

The housing 82 also contains mechanism for indexing the servo-screw and this mechanism comprises a fluid operable lever 84 which is pinned to the end of shaft 85. The lever 84 is moved a predetermined amount each time by a piston 86 which is reciprocably mounted in a cylinder 87, as more particularly shown in Figure 7. The end of this cylinder is connected by a channel 88 to a push button of the control valve 89. This valve has a reciprocable plunger 90 which is normally held in the position shown by a spring 91 which is interposed between the end of the housing in which the valve is contained and an enlarged head 93 which is formed on the end of the plunger to limit the outward movement. The housing has a port 94 to which the channel 88 is connected and a port 95 to which the pressure line 33 from the pump 29 is connected. The plunger 90 has a cannelure 96 which acts to connect ports 95 and 94 when the plunger 90 is depressed by the operator. This allows the fluid to flow to cylinder 87 and thereby rotate the lever 84 a prescribed amount dependent upon the length of stroke of the piston 86. When the piston is actuated, the shaft 85 in Figure 5 will rotate a gear 97 which intermeshes with a spur gear 98 which is supported for free rotation on a sleeve 99. The gear 98 carries a pawl 100 which interengages a ratchet wheel 101 keyed to the screw 24, whereby upon counterclockwise rotation of gear 98, the servo-screw 24 will be indexed a predetermined amount. Although the stroke of piston 86 is always the same, still the amount of indexing of gear 98 may be varied by means of an adjustable guard 102 which is arcuate in shape but is integral with the sleeve 99. This sleeve has a bevel gear 103 keyed thereto in mesh with a bevel pinion 104 keyed to the end of a shaft 105. This shaft projects beyond the housing 82 and is provided with an operating knob 106 which has a bevel face 107 which may be graduated to indicate the amount of movement that will be imparted to the servo-screw for various positions of the guard. In other words, rotation of the knob 106 will, through the gearing, move the guard either clockwise or counterclockwise about the shaft 24 and thereby determine the point of pick up of the pawl 100.

A bleeder coil 108 is inserted between the line 88 through which fluid is supplied to the cylinder 87 and the return line 57 whereby after the valve plunger 90 is released, the fluid in cylinder 87 may drain to reservoir and permit the spring 109 to return the parts.

The servo-valve 22 may thus be actuated by the hand wheel 83 to cause movement of the saddle 13 and will be utilized mostly for set up purposes. This valve may also be actuated by the push button 90, and will be utilized mostly to effect a relative indexing movement between the tool and work in a direction normal to the path of cutting.

The cross slide 17 is actuated by an hydraulic motor comprising cylinder 110 having a contained piston 111 which is connected by a piston rod 112 to the saddle 14. The cylinder 110 is integral with the cross slide 16 and therefore will be the portion which does the actual moving. The flow of fluid pressure to the cylinder is controlled by a pair of servo-valves 113 and 114 which may be selectively connected for individual use by means of a selector valve having an operating knob 115 which is mounted on the front of the machine, as shown in Figure 1. The effective controlling sections of this valve are shown at 116, 117 and 118 in Figure 7 and it will be noted that this entire control mechanism is similar to that shown for the saddle and therefore further description of its operation is not believed to be necessary.

The vertical slide 18 is actuated by an hydraulic motor 119 and a piston 120, the piston being connected by a piston rod 121 to the slide 16, whereby the cylinder 19 becomes the moving element. Actuation of this hydraulic motor may be also be controlled from a pair of servo-valves 122 and 123 and selection between these valves effected by a selector valve having an operating knob 124 which is mounted on the front of the machine, the effective sections of the valve being shown at 125, 126, and 127.

The servo control screw 128 for the cross slide terminates in a hand wheel 129 and the servo-screw 130 for the vertical slide terminates in hand wheel 131.

The vertical slide 18 carries a cutter spindle 132 which is mounted in a quill 133. This quill may be vertically adjusted by means of the mechanism shown in Figure 3. The quill is provided with rack teeth 134 which are engaged by a pinion 135 mounted on a shaft 136. This shaft has a bevel gear 137 intermeshing with a bevel gear 138 secured to the end of an operating shaft 139. Shaft 139 projects through the housing 19 and is provided with a graduated dial 140 and a squared end 141 to which a suitable wrench may be applied for actuating the same.

The upper end of the spindle 132 is provided with a multiple V-slot pulley 142 which is connected by a plurality of V-belts 143 to a similar pulley 144 secured to the end of a motor shaft 145 depending from the hydraulic motor 146.

The automatic movement of the various slides for duplicating purposes is controlled by a tracer 147 which is supported for manual universal movement by means of hand grip 147' and is operatively connected in such a way that lateral deflection or axial movement will cause a relative movement between the cutter and work in a corresponding direction. As shown in Figure 4, the tracer 147 is connected by a Hooke's joint 148 to a lever 149 which is pivotally supported on the vertical slide 18 at 150. This lever is normally held in a horizontal position by virtue of its connection with the servo control valve 123 for the vertical slide. The plunger of this valve, as well as the plungers of the servo-valves 114 and 23, are normally held in a central position by means of springs, and since the construction is the same for all three of these servo-valves, it will be described in connection with valve 114 which is shown in section in Figure 4. The plunger 151 of this valve is supported at each end in the sleeve 152 by anti-friction bearings 153 which serves to hold the plunger in a central position in the sleeve and also facilitates longitudinal movement thereof. Each end of the plunger has a shoulder 154 and the distance between these shoulders is made exactly equal to the length of the sleeve 152 whereby large washers 155 fitted on the reduced ends of the plunger will serve to centralize the plunger axially of the sleeve when urged into engagement with the ends of the sleeve. This urging means comprises springs 156 mounted on the reduced ends of the plunger which are interposed between the washers 155 and the adjusting nut 157. By rotating these nuts, the tension of the springs may be varied to insure that the plunger will be normally positioned in a central axial position relative to the sleeve and yet permit of easy manual movement of the valve plunger to either side of its central position.

The plunger itself is connected to the tracer by means of a rod 158 which in the case of valve 114, is directly connected to the tracer arm 159. In this case the rod is threaded on the end and passed through a hole in the tracer arm and lock nuts 160 provided on each side of the tracer arm for locking the rod for movement by the tracer. The rod 158 passes through an axial bore 161 formed in the plunger and is connected to the remote end of the plunger by means of a cup shaped member 162 which is threaded on the end of the plunger and in which is formed a threaded bore 163 for receiving the end of the rod. It will be noted that if the tracer arm 159 is deflected to the right or left, as viewed in Figure 4, that movement of the plunger will result, but if the tracer is moved axially, the connecting rod 158 has sufficient flexibility to permit such movement without disturbing the position of the valve plunger. It will therefore be noted that the rod 158 serves as a tension and compression member for causing movement of the plunger but is ineffective under lateral strain. Since the operating rod 158' for the servo-valve 123 is similarly held in a definite axial position when no pressure is being applied to the tracer, and since this rod is connected to the lever 149 between the pivot 150 and the Hooke's joint, it will be apparent that by proper adjustment of the locking nuts 160 that the lever 149 may be normally supported in a horizontal position. It will be noted that the operating rods for the servo-valve 114 for the cross slide 16, and servo-valve 23 for the saddle 13, are connected to the tracer in right angular relation. This means that the tracer can be deflected in directions to cause actuation of one valve severally and thereby movement of the connected slide without causing movement of the other.

It should be obvious that the greater the movement of the servo-valve from a central position, the greater will be that rate of movement of the connected slide and in order to limit this rate, the upper end of the tracer arm is passed through a sleeve 164 which has a tapered bore 165 surrounding a tapered portion 166 formed on the end of the tracer arm. By adjusting the sleeve 164 up or down the amount of clearance between the tapered portion 166 and the tapered bore 165 can be varied to thereby limit the maximum movement that can be given to the tracer arm and in either a lateral direction or in a vertical direction. The means for effecting this adjustment may consist of a small pinion 167 supported for rotation in the bracket 168, the pinion intermeshing with rack teeth 169 cut in the periphery of the sleeve 164. This pinion may be rotated by means of a small hand wheel 170, as shown in Figure 1.

It will be noted that by virtue of the various connections of the tracer arm to the various servo control valves, that the tracer arm is entirely supported thereby and that when it is free, all of the servo-valves are in a stop position.

By means of the selector valves associated with each slide, one or more of the slides may be disconnected from the tracer by rotation of the control knobs 25, 115 and 124 located on the front of the machine. Thus if a strictly profiling operation in a horizontal plane is to be performed, the vertical slide may be disconnected and thereby limit the relative movement between the tool and the work to a horizontal plane. If after going around the outline of a pattern, it is desired to circumscribe the same again but to a greater depth, the push button 90 may be depressed, which will effect a relative indexing between the vertical slide and the work table.

On the other hand, if a die sinking operation is to be performed, one of the horizontal slides may be disconnected whereby the feeding movement will be along a direction parallel to the direction of movement of the other slide, and during that movement the cutter will be moved axially up and down in accordance with the profile of the pattern. After one complete stroke in this manner, an indexing movement may be effected by the stationary slide through operation of the push button 90. It is to be remembered that although the push button 90 will simultaneously cause actuation of all of the ratchet plungers, that the only ones that will be effective are the ones in which the selector control knob is set on "Screw."

The hydraulic motor 146 which rotates the spindle is connected in a closed circuit with a variable delivery pump 171 as more particularly shown in Figure 7. The opposite sides 172 and 173 of this circuit are connected by check valves 174 to line 175, whereby make-up fluid to compensate for leakage may be supplied to either side of the circuit. Fluid is supplied to the line 175 by the VD pump 29 through an hydraulic resistance 176, and the other end of the line 175 is connected by an hydraulic resistance 177 to reservoir. By properly selecting the value of these two resistances, the pressure in line 175 may be held to some predetermined value between the pressure in line 33 and atmospheric pressure. If they are made equal, then the pressure in line 175 will be one-half of the pressure in line 33.

There has thus been provided an improved manual controlled profiling and die sinking machine which is very efficient in operation and comparatively inexpensive to build.

What is claimed is:

1. In a duplicating machine having a cutter support and a plurality of hydraulic cylinders for moving said support in a plurality of directions normal to one another, the combination of individual control valve plungers for controlling the flow of fluid to and from said cylinders, a tracer supported by said plungers, means normally positioning said valve plungers to prevent flow to or from said cylinders, and manually operable means for moving said tracer to cause movement of the cutter support in a direction corresponding to the direction of movement of the tracer.

2. In a duplicating machine having a work support and a cutter support, the combination of a plurality of fluid operable pistons arranged at right angles to one another for effecting relative movement between cutter and work support in directions normal to one another, individual control valves for controlling the flow of fluid to and from said pistons, said valves being arranged in planes parallel to the direction of movement of the respectively controlled pistons, resiliently operable means for maintaining said valves in a stop position, and a tracer operatively connected for moving said valves, said resiliently operable means also acting to hold said tracer in a neutral position.

3. In a duplicating machine, the combination with a plurality of fluid operable pistons for effecting relative movement between a tool and work piece in a plurality of angularly related directions, of a tracer for controlling the flow of fluid to said pistons, including angularly arranged control valves having reciprocable plungers therein, resilient means for maintaining said plungers in a central position, and tension members connecting said plungers to the tracer, said members being flexible to permit movement of one angularly related valve by the tracer without disturbing the position of the other valve.

4. In a duplicating machine having a pair of angularly related piston and cylinder units for effecting relative movement between a tool and work piece in angularly related directions, the combination of a pair of angularly related control valves for the respective cylinders, each valve having a plunger with a central bore formed therein, a tracer supported at the intersection of the axes of said plungers, and tension members passing through the bores of said plungers and operatively connected at one end to the tracer and at the other end to a plunger, whereby the tracer may be deflected in the plane containing the axis of one of said valves for causing movement of the plunger thereof without disturbing the position of the other plunger.

5. In a duplicating machine having a cutter support and a work support, the combination with a pair of pistons and cylinders for effecting relative movement between the parts in two directions at right angles to one another in a plane, and a third piston and cylinder for effecting relative movement between the parts in a direction at right angles to said plane, of individual control valves for said cylinders having means for controlling the flow of fluid to and from said cylinders, including valve plungers, a tracer, means operatively connected to the control valve for said third cylinder for supporting the tracer in space, motion transmitting connections from the tracer to the remaining control valves, whereby the tracer is normally held against three directional movement, and manually operable means for moving said tracer to cause relative movement between the tool and work support.

6. In an hydraulically operated duplicating machine the combination of a first pair of control valves arranged in horizontal planes and operatively connected to a tracer, a third control valve mounted in a plane perpendicular to the first named plane and in parallel relation to the axis of the tracer, each of said valves having a plunger resiliently held in a predetermined axial position, means supporting said tracer from said plungers, including a universal joint supported by said vertical valve, whereby during lateral deflection of the tracer the valve will move about said universal joint.

7. In a duplicating machine having a tool support and a work support, the combination of means for effecting relative movement between the supports, including an hydraulic motor coupled to one of said supports, a source of pressure, a pair of servo-valves, means to selectively connect the valves in series between said source and said motor, a tracer connected for operation of one of said servo-valves, and a manually operable rotor selectively connectible to the other servo-valve, whereby movement between the cutter and work may be governed by a pattern or by actuation of the rotor.

8. In a machine tool having a pair of relatively movable supports, the combination of a fluid operable motor for effecting said movement, a source of fluid pressure for the motor, a pair of different controls for governing the rate and direction of said movement, a servo-valve operatively connected to each of said controls, and means to selectively connect either one of said servo-valves in series between said pressure source and said motor to thereby select the control which is to govern the relative movement between the tool and work.

9. In a machine tool having a plurality of slides for effecting relative movement between the tool and work supports of the machine in a plurality of directions, the combination of fluid operable motors connected to the individual slides, a source of pressure for said motors, a pair of servo-valves for each motor, a tracer, means connecting one of each pair of servo-valves to the tracer, a rotor associated with each slide, means to selectively connect the rotors to the remaining servo-valves of the respective pairs, and control valve means for selectively connecting either servo-valve of each pair in series between the source of pressure and the respective motor, whereby the tracer may jointly control the movement of the slides connected thereto, or the rotors severally control the remaining slides.

10. In a machine tool having a translatable slide for effecting relative movement between a cutter and a work piece, the combination of a fluid operable motor coupled to said slide, a source of fluid pressure, a pair of servo-valves, a tracer permanently connected to one of said servo-valves, a rotor, means to selectively connect said rotor for control of the other servo-valve, and control valve means for selectively connecting said servo-valves in series between said source of pressure and said motor, and means for simultaneously connecting said rotor to its respective servo-valve when said valve is connected in series with said motor.

11. In a profiling and die sinking machine, the combination of a plurality of supports for effecting relative movement between the tool and work in a plurality of directions, fluid operable motors for moving each support, a tracer controlled servo-valve and a lead screw controlled servo-valve for each of said motors, means to connect hydraulically any two of the first-named servo-valves with their respective motors, whereby the tracer may control two-directional movement between the cutter and support, means to connect the lead screw controlled servo-valve of a remaining slide to its respective motor, an hydraulic pick feed mechanism associated with said screw, and a push button controlled valve for connecting pressure to said pick feed mechanism, whereby the tracer may determine one plane of movement between the cutter and work and the pick feed mechanism may effect indexing to another plane of operation.

12. In a hydraulically operated contouring machine, the combination of a tracer, a support, mechanical means carried by the support for suspending the tracer in a predetermined position in space, a plurality of valve members for controlling hydraulic operation of the machine and each having operative and inoperative positions, and means connecting the valve members to the tracer in a manner that the valve members are in an inoperative position when the tracer is in said predetermined position whereby any movement of the tracer will cause shifting of one or more of said valve members to an operative position.

13. In a contouring machine having a cutter support and a work support, the combination with a hydraulic system for effecting relative movement between the supports, of a tracer, a plurality of linkages for suspending the tracer from the cutter support in a predetermined position in space, a plurality of control valve members connected to the tracer so as to lie in an inoperative position when the tracer is in said predetermined position and each responsive to a different direction of movement of the tracer whereby regardless of the direction of movement of the tracer one or more valve members will be shifted to an operative position.

14. In a contouring machine having a cutter support and a work support, the combination of a tracer, a first lever connecting the tracer to the cutter support for suspending the tracer against movement in one direction, additional members connecting the tracer to the support for holding the tracer against movement in two other directions whereby the tracer is held in a predetermined suspended position in space, control valves connected to said lever and said members, means normally holding said valve members in a neutral position, said means also acting to automatically return the tracer to its predetermined position when released after manual deflection thereof.

BERNARD SASSEN.